United States Patent
Sun et al.

(10) Patent No.: US 6,694,016 B1
(45) Date of Patent: Feb. 17, 2004

(54) ODD-ORDER LOW-PASS POTS DEVICE MICROFILTER

(75) Inventors: Ting Sun, Houston, TX (US); Brian L. Hinman, Los Gatos, CA (US)

(73) Assignee: 2Wire, Inc., San Jose, CA (US)

(*) Notice: Subject to any disclaimer, the term of this patent is extended or adjusted under 35 U.S.C. 154(b) by 57 days.

(21) Appl. No.: 09/943,825

(22) Filed: Aug. 30, 2001

Related U.S. Application Data

(63) Continuation of application No. 09/544,731, filed on Apr. 6, 2000, now Pat. No. 6,285,754.

(51) Int. Cl.$^7$ .............................. H04M 1/00; H04M 9/00
(52) U.S. Cl. .............................. 379/399.01; 379/93.01; 379/93.05; 379/93.08
(58) Field of Search ........................ 379/399.01, 93.08, 379/93.01, 93.05

(56) References Cited

U.S. PATENT DOCUMENTS

| | | | |
|---|---|---|---|
| 4,013,842 A | | 3/1977 | Kao et al. |
| 4,456,985 A | | 6/1984 | Carsten et al. |
| 4,456,986 A | | 6/1984 | Carsten et al. |
| 4,546,212 A | | 10/1985 | Crowder, Sr. |
| 4,577,255 A | | 3/1986 | Martin |
| 4,656,451 A | * | 4/1987 | Pomponio |
| 4,703,409 A | | 10/1987 | Spreen |
| 4,757,495 A | | 7/1988 | Decker et al. |
| 4,785,448 A | | 11/1988 | Reichert et al. |
| 4,799,213 A | | 1/1989 | Fitzgerald |
| 5,025,443 A | | 6/1991 | Gupta |
| 5,255,267 A | | 10/1993 | Hansen et al. |
| 5,581,434 A | * | 12/1996 | Landler |
| 5,627,501 A | | 5/1997 | Biran et al. |
| 5,757,803 A | | 5/1998 | Russell et al. |
| 5,974,139 A | | 10/1999 | McNamara et al. |
| 5,982,785 A | | 11/1999 | Woerner et al. |
| 6,005,873 A | | 12/1999 | Amit |
| 6,067,316 A | | 5/2000 | Amrany et al. |
| 6,069,899 A | * | 5/2000 | Foley |
| 6,097,262 A | | 8/2000 | Combellack |
| 6,144,734 A | * | 11/2000 | Beeman |
| 6,301,337 B1 | * | 10/2001 | Scholtz et al. |

OTHER PUBLICATIONS

Williams, A. B. ; Electronic Filter Desgn Handbook, 1981, McGraw–Hill Book Company; Chpater 3; pp. 3–1 to 3–15.*
Langford–Smith (editor), Radiotron Designer's Handbook; Wireless Press, Sydney, Australia, 1953; Chapters 4, 5; pp. 128–213.

* cited by examiner

Primary Examiner—Forester W. Isen
Assistant Examiner—Ramnandan Singh
(74) Attorney, Agent, or Firm—Blakely, Sokoloff, Taylor & Zafman LLP

(57) ABSTRACT

An odd-order low-pass microfilter is disclosed for being interposed between a home telephone wiring network and a POTS, or voice band, device to separate voice-band signals from higher frequency signals, such as ADSL signals and home networking signals. The filter topology is substantially symmetric so that the filter is reversible in that either end of the filter may be directly coupled to the home telephone wiring network without impairing high frequency signal performance or the filter characteristic of the filter. In one embodiment, the filter is a three-pole filter with a single capacitor disposed between a pair of coupled inductors. Each of the coupled inductors advantageously has an inter-winding capacitance over about 100 pF to improve the filter frequency response without increasing the cost of the filter. In another embodiment, the filter is a reversible three-pole filter with a single capacitor disposed between first and second pairs of uncoupled, or discrete, inductors.

24 Claims, 10 Drawing Sheets

ODD-ORDER LOW-PASS POTS DEVICE MICROFILTER

CROSS-REFERENCE TO RELATED APPLICATIONS

This application is a continuation of U.S. patent application Ser. No. 09/544,731, entitled "Odd-Order Low-pass POTS Device Microfilter," filed Apr. 6, 2000, which issued as U.S. Pat. No. 6,285,754, which is related to, and claims the priority of U.S. patent application Ser. No. 09/353,111, entitled "Odd-Order Low-Pass POTS Device Filter," filed on Jul. 14, 1999, which is now abandoned. The subject matter of the related applications is hereby incorporated by reference.

BACKGROUND OF THE INVENTION

1. Field of the Invention

This invention relates generally to low-pass filters and, more particularly, to a reversible, odd-order low-pass microfilter for separating DSL and home networking signals from voice-band signals existing on the same pair of copper wires.

2. Description of the Background Art

With the advent of DSL (Digital Subscriber Line) and home networking data transmission technologies, it may be desirable to have DSL signals, home netvorking signals, or both present on a home telephone wiring network simultaneously with voice-band signals. Voice-band signals are commonly referred to as POTS (Plain Old Telephone Service) signals. Providing DSL service, home networking, and POTS over standard telephone lines permits the home telephone wiring network to operate as a local area network (LAN), while at the same time permitting voice-band and DSL service to be transmitted across the home telephone wiring network.

Despite the advantages of providing DSL, home networking, and POTS signals simultaneously over a common home telephone wiring network, it is desirable to prevent energy from the DSL and/or home networking signal carriers from reaching voice-band, or POTS, appliances coupled to the home telephone wiring network. It is also desirable to prevent POTS device impedance effects beyond about 4 kHz from entering onto the home telephone wiring network and disrupting transmission of DSL data signals. Voice-band appliances may include, for example, telephone sets, facsimile machines, 56K modems, and the like. Indeed, energy from the DSL or home networking signal carriers may cause nonlinear behavior of the voice-band appliances to create noise into the POTS connection. Further, preventing DSL and home networking signals from reaching voice-band appliances protects the DSL and home networking transports from high-frequency intermodulation products of the voice-band appliances.

Voice-band appliances typically undergo impedance changes during operation. For example, state changes in a POTS device such as on/off hook, dialing, and ringing tend to affect the impedance of the POTS device. This change in impedance, unless isolated from the DSL modem, may limit the throughput of the DSL or home networking devices and may require dynamic bit reloading in modulation and line retraining, and could result in loss of modem connection.

Conventionally, a second-order low-pass Butterworth filter is disposed between the home telephone wiring network and an associated POTS device to prevent DSL signals, such as ADSL signals, on the home telephone wiring network from entering the POTS device and to prevent transient noise from POTS devices from interfering with the proper operation of a DSL modem coupled to the home network and vice versa. The filter topology of the second-order Butterworth microfilter is inherently asymmetrical and generally includes one coupled inductor (or two uncoupled inductors) and one capacitor. This design is unilateral and non-reversible in that it requires, for proper operation, that the microfilter be oriented between the POTS device and the home telephone wiring network such that the coupled inductor is disposed between the home telephone wiring network and the capacitor. Indeed, if the capacitor is disposed adjacent to the home telephone wiring network, high frequency signals, such as DSL signals, on the home telephone wiring network are likely to short, or be shunted, across the capacitor, thus interfering with the operation of the DSL modem. In short, these conventional microfilters are not reversible in that they only function properly when correctly oriented. Thus, users who install the two-pole microfilter in a reversed, or "backwards", tit configuration will likely suffer from poor filter and DSL modem performance.

Another disadvantage of conventional second-order. Butterworth microfilter designs is that they do not provide sufficient attenuation of DSL. signals. For example, a typical second-order Butterworth microfilter may be designed with an insertion loss of about 0.3 dB loss throughout the pass band, which includes the POTS band (about 0–4 kHz) and has a cutoff frequency of about 8 kHz. As those skilled in the art will appreciate, it is highly desirable for this cutoff frequency to be above the POTS signal band and well below the ADSL transmission band (i.e. below about 25 kHz). Given the 8 kHz cutoff frequency, the total attenuation achieved at 25 kHz (the beginning of the DSL band) is, at a maximum, only about 19 dB. This amount of attenuation is generally insufficient in that it allows a significant amount of DSL transmit signal leakage through the filter, and could cause interference with the associated POTS device, particularly if the associated POTS device is a data device, such as a facsimile machine or a data modem.

Further, as with many things, it is desirable to keep the costs of producing the microfilter low. A significant factor in determining the cost of producing a microfilter is the number of components that make up the microfilter. In general, the higher the number of components that make up the microfilter, the higher the cost will be to produce the microfilter. Consequently, it is desirable to keep the component count of a given microfilter design low to keep the production cost low.

Accordingly, a need exists to provide a system and method for preventing energy from DSL and home network signal carriers from reaching voice-band appliances such as telephones, facsimile machines, and 56K modems. Another need exists to provide a system and method for isolating DSL devices and HPNA (Home Phoneline Network Alliance) standard devices from the impedance fluctuations of voice-band appliances. Moreover, an additional need exits to provide a system and method for separating, or isolating, voice-band appliances from DSL and HPNA devices that is robust, inexpensive, and easy to install.

SUMMARY OF THE INVENTION

The present invention overcomes or substantially alleviates prior problems associated with systems and methods for separating or isolating voice-band appliances from DSL and HPNA devices. In general, the present invention provides a reversible odd-order low-pass filter that may be disposed between a POTS device and a home telephone wiring network to isolate the POTS device from certain higher frequency signals, such as DSL band signals, that may be present on the home telephone wiring network. The filter also prevents POTS device impedance changes within the DSL band from appearing on the home telephone wiring network.

The filter topology is substantially symmetric in that the topology features reversible plug-in capability so that either end of the filter may be coupled to the home telephone wiring network without interfering with the filtering function of the filter and without shorting, or shunting, the higher frequency signals, such as ADSL signals, on the home telephone wiring network. Further, the filter presents aselatively low insertion loss so that the filter does not cause significant attenuation of the POTS signal as the POTS signal passes through the filter, thus not impairing the operation of the associated POTS device.

Pursuant to one embodiment, the low pass filter is a passive odd-order low-pass reversible microfilter that includes a capacitor disposed between pairs of inductors for disposition between the telephone wiring network and an associated POTS device to high frequency signals from reaching the POTS device and for isolating the POTS device impedance changes from the network. The inductors may be either coupled or uncoupled inductors. According to this configuration, the microfilter is reversible in that either end of the microfilter may be disposed adjacent to the to the telephone network without shorting high frequency signals, such as ADSL signals, across the capacitor due to the presence of a pair of inductors on both sides of the capacitors.

In another embodiment, the low-pass filter is a passive third-order low-pass microfilter design scheme based on a 600 ohm balanced network and includes a pair of coupled inductors separated by a capacitor. Advantageously, each of the coupled inductors has combined interwinding capacitance greater than about 100 pF. Due to the intentionally-introduced interwinding capacitance of the coupled inductors, the frequency response of the low-pass filter closely resembles that of a higher order Chebyshev II function, also known in the art as an "inverse Chebyshev" function This filter function generally has a flatter magnitude response in the pass band than conventional Chebyshev filters and much steeper attenuation beyond the cutoff frequency than the conventional Butterworth filter described above. Pursuant to this embodiment, the filter presents more than about 35 dB of attenuation beginning at 25 kHz with a 3 dB cutoff frequency point at about 6 kHz, which offers sufficient signal rejection to prevent DSL signals from reaching the associated POTS band device and potentially causing performance degradation.

This odd-order design is advantageous in that it effectively and inexpensively isolates high frequency signals, such as DSL signals, on a home telephone wiring network from reaching POTS devices, as well as preventing the impedance changes of the POTS devices from interfering with the DSL or home networking service. Additionally, since the odd-order filter does not employ a capacitor disposed outside of the coupled or uncoupled inductors, the filter is reversible in that either end of the filter may be coupled to the home telephone wiring network without shorting, or shunting, the high frequency signals across the capacitor or otherwise impairing the filter characteristic of the filter. Thus, even if a user installs the filter "backwards," the filter will still generate the same frequency response and function satisfactorily without shorting the higher frequency signals on the home telephone wiring network.

Further, the present design provides a microfilter having a single resonant frequency point disposed above the POTS frequency band (i.e. above about 4 kHz) and well below the DSL band (i.e. below about 25 kHz) to avoid introducing unexpected impedance impairments to both POTS and ADSL operations. Additionally, the microfilter provides a relatively high impedance across the DSL frequency band beginning at about 25 kHz for both on-hook and off-hook conditions to block impedance changes caused by an associated POTS device. Moreover, to avoid high signal loss across the DSL band, the microfilter advantageously has an input impedance of at least 400 ohms.

Other advantages and features of the present invention will be apparent from the drawings and detailed description as set forth below.

DETAILED DESCRIPTION OF THE PREFERRED EMBODIMENT

Figure 1:
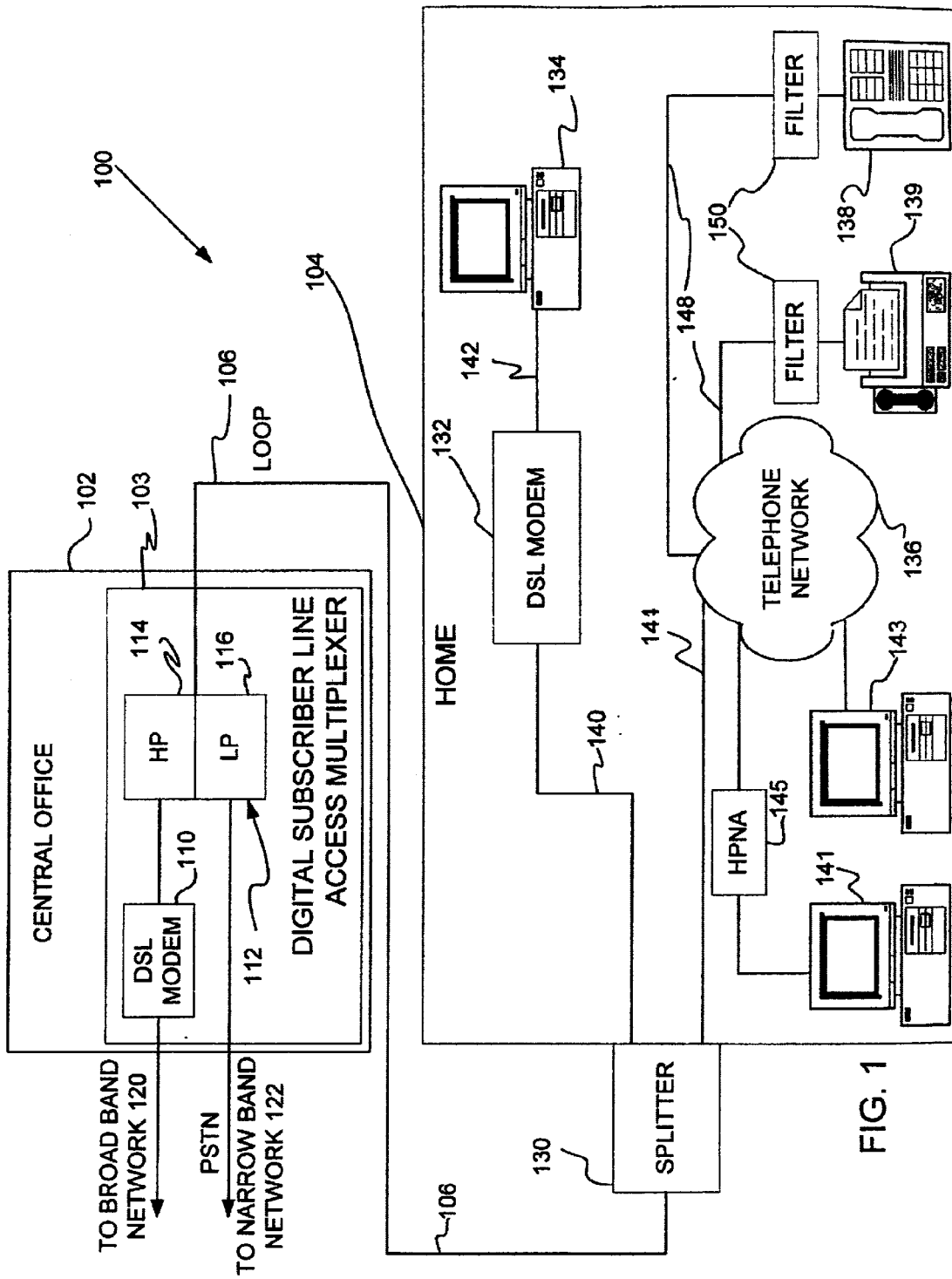
FIG. 1 is a block diagram illustrating a spluttered DSL service network.

FIG. 1 illustrates a DSL, such as ADSL, service network 100 that includes a central office 102 including a Digital Subscriber Line Access Multiplexer (DSLAM) 103 and a home 104 coupled by a loop 106. As shown, the central office 102 includes a DSL modem unit 110 and a loop interface 112. The loop interface 112 includes a high pass filter 114 and a low pass filter 116 to split high frequency DSL components of the loop signal and the lower frequency POTS (Plain Old Telephone Service) components of the loop signal. In this configuration, the high pass filter 114 passes signals in the DSL frequency range to the broadband network 120 via the DSL modem 110. Likewise, the low pass filter 116 passes the lower frequency POTS signals to the narrow band network 122 over a PSTN (Public Switched Telephone Network) line.

The home 104 is shown as including a splitter 130, a DSL modem 132, a computer 134, a home telephone wiring network 136, and POTS devices, such as telephone 138 and facsimile machine 139. Lines 148 couple the telephone 138, the facsimile machine 139, as well as other POTS devices (e.g. 56 k modems, etc.) (not shown), to the home telephone wiring network 136.

Further, personal computers 141 and 143 are illustrated as being coupled to the network 136. The computer 141 is shown as having an external HPNA (Home Phoneline Network Alliance) standard network interface card 145. The computer 143 has an internal HPNA card (not shown) so that the computers 141 and 143 may communicate using high-frequency home networking (HPNA standard) signals over the network 136. While the DSL modem 132 is illustrated as being disposed outside of the computer 134, those skilled in the art will appreciate that the DSL modem 132 could also be positioned inside the computer 134.

The splitter 130 splits the incoming signal, which may include DSL signals, POTS signals, or both into high (DSL) and low (POTS) frequency components. As discussed in more detail below with reference to FIG. 2, the splitter 130 routes the high frequency component along line 140 to the DSL modem 132, which is coupled to a network device, such as a computer 134, by a line 142. Likewise, the splitter 130 routes the low frequency, or POTS, component of the incoming signal to the home telephone wiring network 136 along line 144. The telephone 138, the facsimile machine 139, as well as other POTS devices (e.g. 56 k modems, etc.) (not shown), are coupled to the home telephone wiring network 136 by lines 148.

A low-pass filter 150 is shown as being disposed between each POTS device and the home telephone wiring network 136. As discussed in more detail below, the low-pass filters 150 can be used but may not be required, to prevent the home networking high frequency energy on the home telephone wiring network 136 from reaching the POTS voice-band appliances, such as the telephone 138 and the facsimile machine 139. Home networking, or HPNA standard, signals reside above 2 MHz and usually reside in the band ranging from about 5 MHz to about 10 MHz. The filters 150 substantially reduce, or eliminate, the non-linear behavior of the voice-band appliances from creating noise onto the home telephone wiring network 136 and protects home networking transports from high-frequency inter-modulation products from the voice-band appliances.

Details concerning ADSL equipment are found in Standards Project for Interfaces Relating to Carrier to Customer Connection of Asymmetrical Digital Subscriber Line (ADSL) Equipment, T1E1.4/97-007R6, T1.413 Issue 2, edited by John Bingham and Frank van der Putten, dated Sep. 26, 1997, which is incorporated herein by reference.

Figure 2:
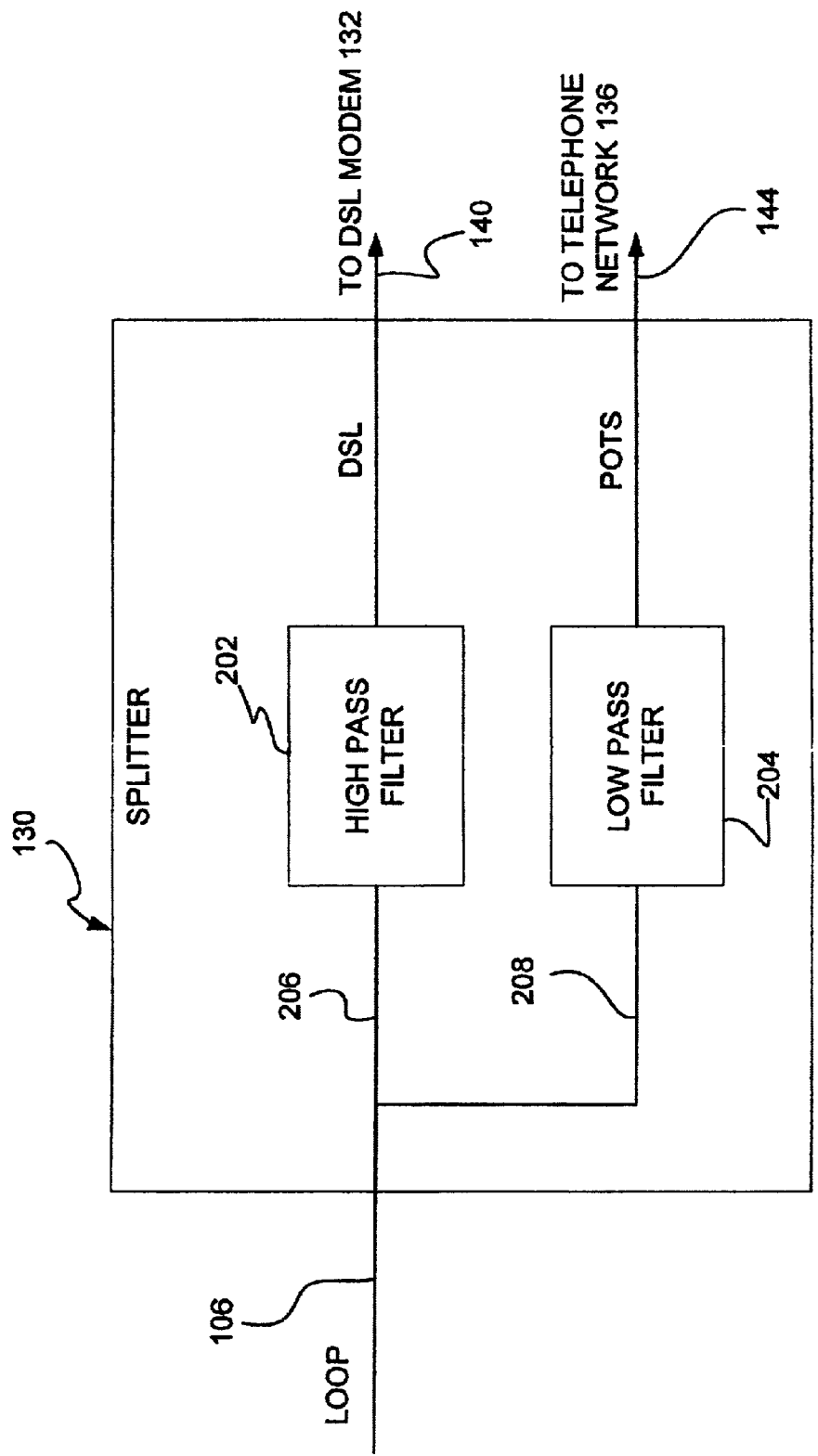
FIG. 2 is a block diagram of the splitter of FIG. 1.
Figure 3:
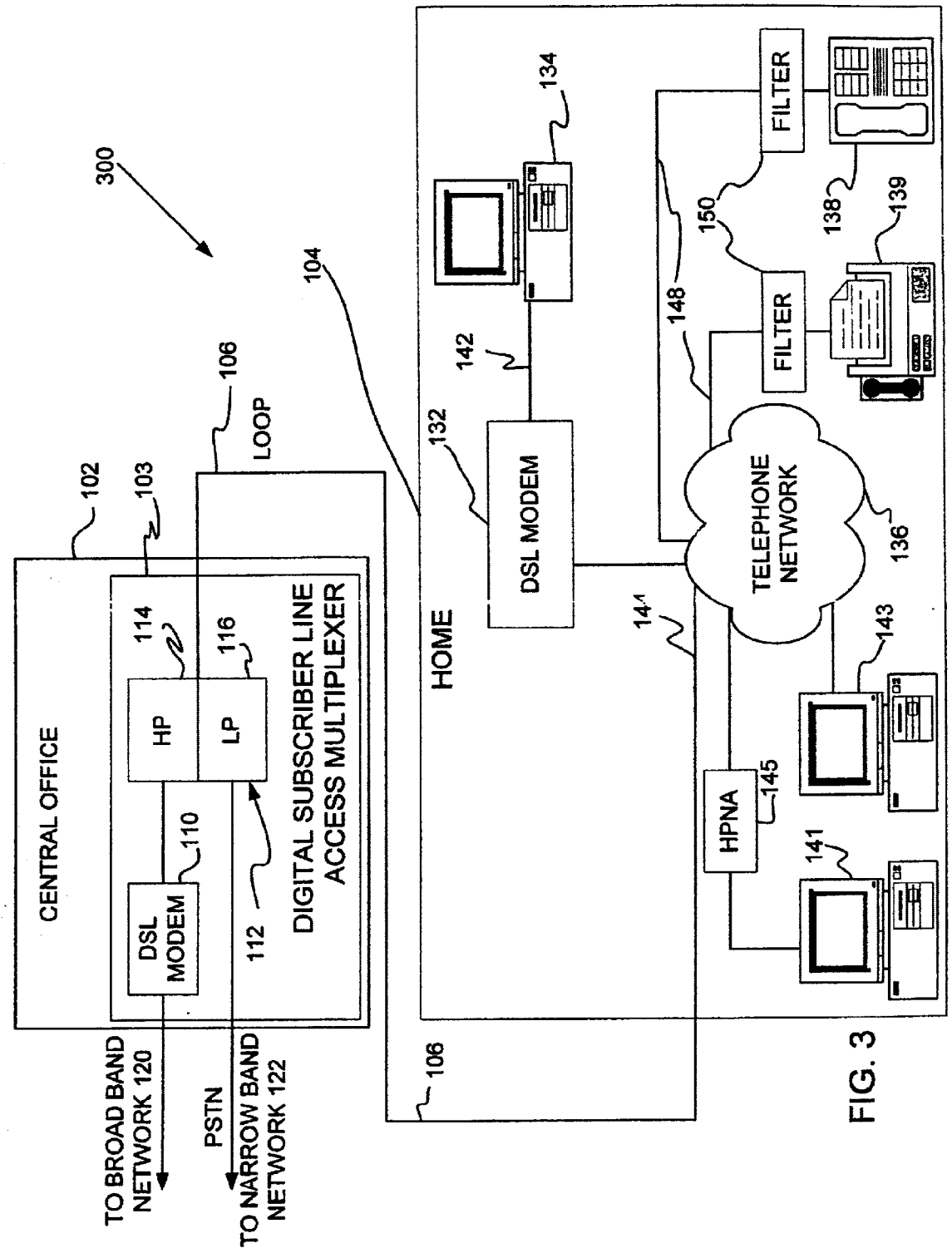
FIG. 3 is a block diagram illustrating a splitterless DSL service network.

FIG. 2 illustrates details of the splitter 130 of FIG. 1. As shown, the splitter 130 includes a high pass filter 202 and a low pass filter 204 coupled to the loop 106 via lines 206 and 208 respectively. The high pass filter 202 permits higher frequency signals, such as DSL signals, to pass from the loop 106 to the DSL modem 132 (FIG. 1) while preventing the lower frequency POTS signals from entering onto the line 140 and potentially interfering with the operation of the DSL modem 132. Similarly, the low pass filter 204 permits the lower frequency POTS signals to pass onto the home telephone wiring network 136 while preventing higher frequency signals, such as DSL signals, from entering onto the home telephone wiring network 136. Moreover, the splitter 130 also separates or isolates FIG. 3 illustrates a splitterless DSL network 300, such as that which might be used to support DSL service using the International Telecommunications Union (ITU) G.992.2 (G.lite) or G.992.1 (G.dmt) standards, or to support T1.413. Issue 2 full-rate ADSL. The network 300 differs from that illustrated in FIG. 1 in that it does not include the splitter 130 disposed between the loop 106 and the home telephone wiring network 136 or the DSL modem 132. As such, the loop 106 is directly coupled to the home telephone wiring network 136 via the line 144 and, therefore, DSL, home networking, and POTS (or voice-band) signals pass simultaneously over the home telephone wiring network 136. Like the network 100 shown in FIG. 1, the network 300 includes low pass filters 150 disposed between the home telephone wiring network 136 and the voice-band appliances 138 and 139. In this embodiment, the low-pass filters 150 generally prevent the higher frequency signals (signals above about 25 kHz) from interfering with operation of the associated voice-band or POTS devices 138 and 139 and separate POTS device impedance changes from the DSL and HPNA signal carriers.

Figure 4A:
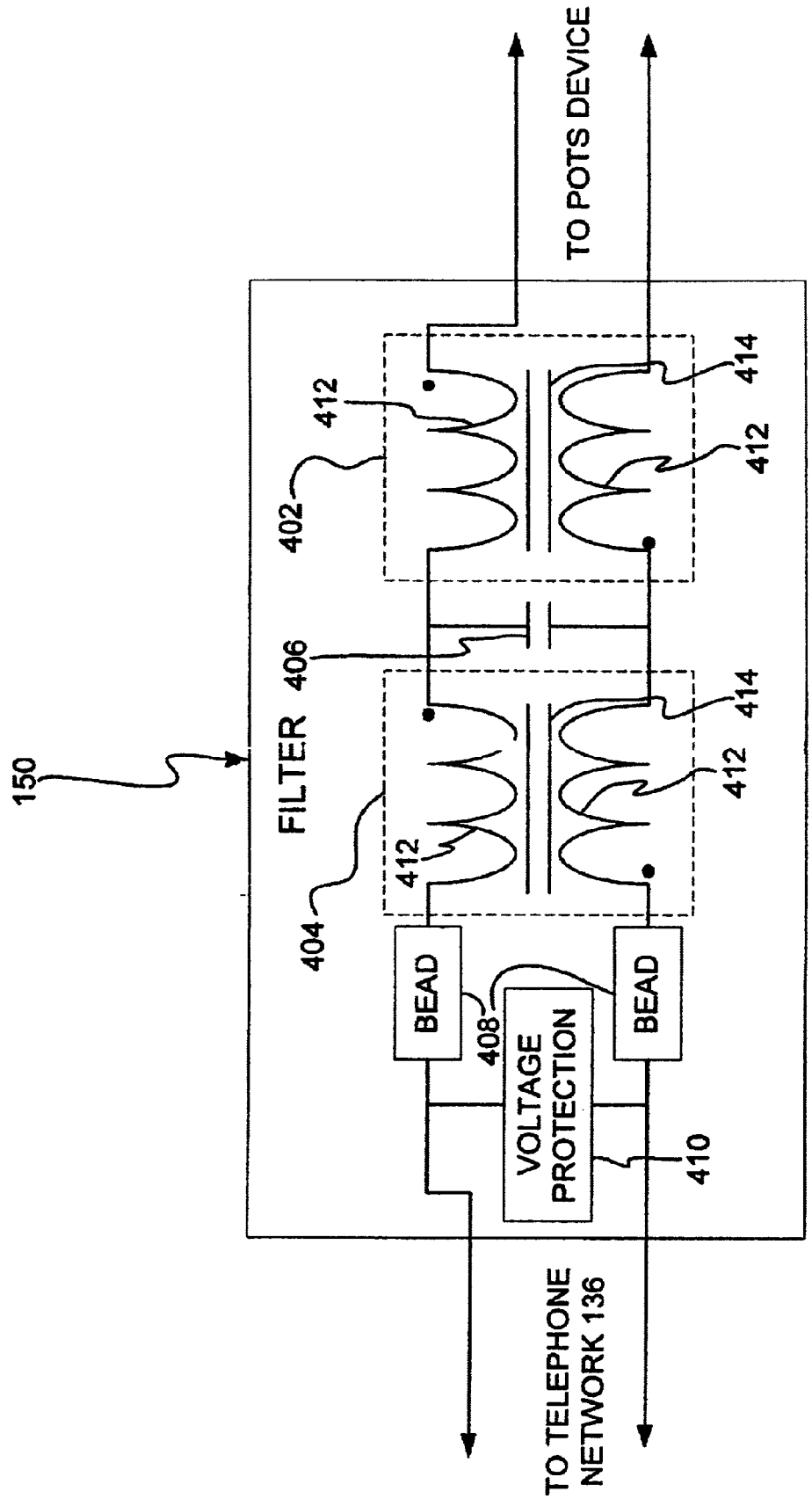
FIG. 4A illustrates details of one embodiment of one of the filters of FIGS. 1 and 3, which uses coupled inductors.

FIG. 4A illustrates the topology of one embodiment of the filter 150 shown in FIGS. 1 and 3. The filter 150 of FIG. 4A is a reversible three-pole odd-order low pass filter and includes first and second coupled inductors, or transformers, 402 and 404 with a capacitor 406 therebetween. Moreover, the filter 150 is shown as having a pair of ferrite beads 408 and a hazardous transient voltage protection circuit 410. The ferrite beads 408 and the hazardous transient voltage protection circuit 410 are optional components and may not be required in all applications. Rather, the beads 408 and the voltage protection circuit 410 may be used for compliance with applicable regulatory requirements. In a preferred embodiment, the hazardous transient voltage protection circuit 410 comprises a sidactor transient voltage suppressor.

The filter 150 is further illustrated as being disposed between the home telephone wiring network 136 and a POTS device, such as the telephone 138 (FIG. 1) with the coupled inductor 404 closest to or adjacent the home telephone wiring network 136. A significant advantage of the design of FIG. 4 is that the capacitor 406 is disposed between the two coupled inductors 402 and 404 so that regardless of which end of the filter 150 is coupled to the home telephone wiring network 136, the capacitor 206 will not short, or shunt, a high frequency signal, such as a DSL signal, on the home telephone wiring network 136. This advantage makes the filter 150 reversible in that either end of the filter 150 may be coupled to the home telephone wiring network 136 without shorting high frequency signals across the capacitor or otherwise impairing transmission of high frequency signals.

The capacitor 406 advantageously has a capacitance in the range of about 0.022–0.068 microfarads (22–68 nanofarads). For example, pursuant to one embodiment, the capacitor 406 has a capacitance of about 47 nanofarads. The first and second coupled inductors 402 and 404 are shown as being configured identical to one another. The first coupled inductor 402 includes a pair of windings 412 wrapped about a core 414. In one embodiment, each of the windings 412 has an inductance of about 3 mH–7.5 mH±10% (about 2.7–8.3 mH) and the core 214 comprises a conventional EP 13, EP10, EP 7 coupled inductor core, although those skilled in the art will appreciate that other coupled inductor core materials could also be employed.

Figure 6:
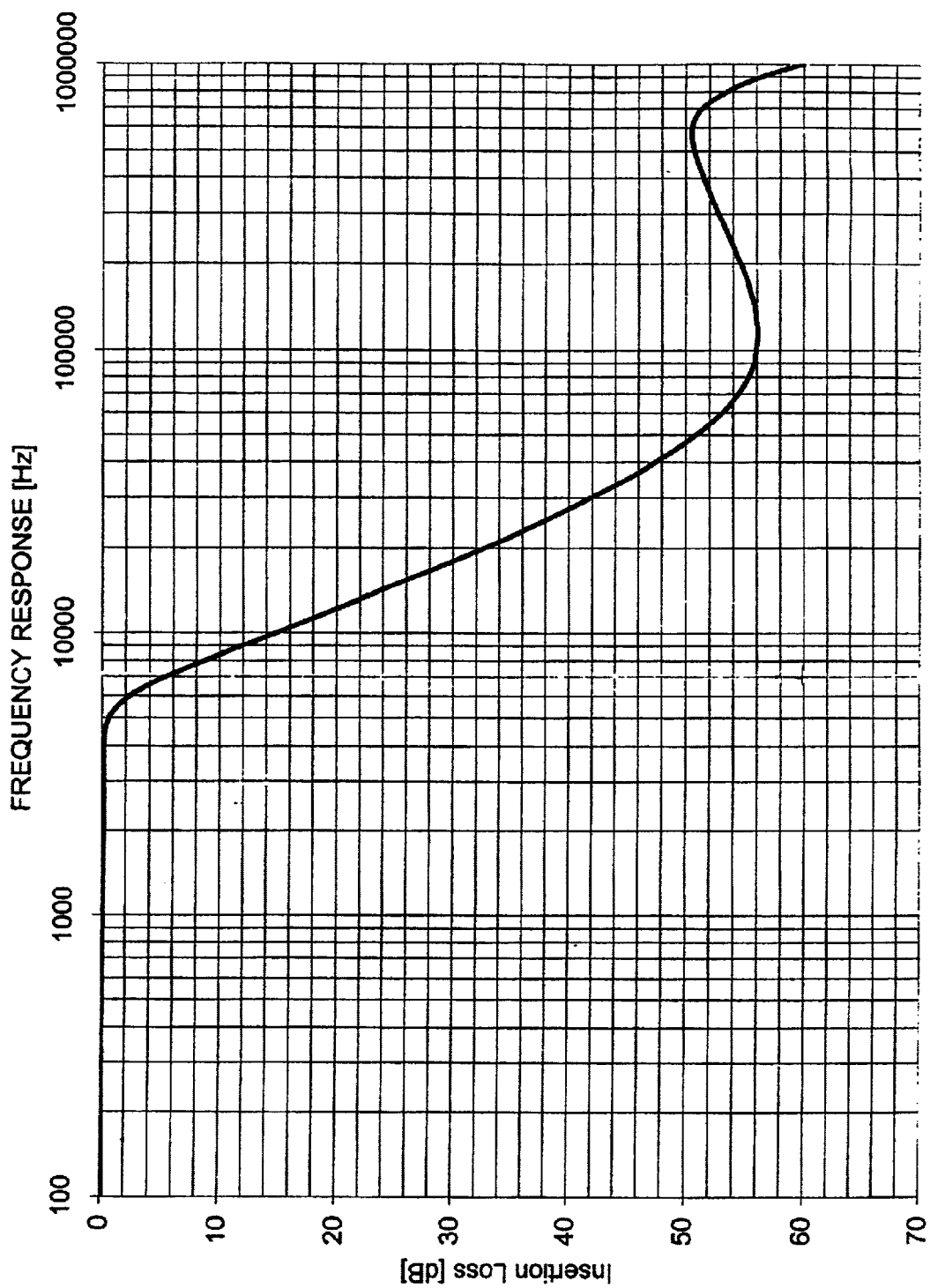
FIG. 6 illustrates the frequency response of the filter of FIG. 4A.

This coupled inductor configuration yields a relatively high inductance as it includes both the self inductance of each winding together with the mutual inductance of the coupled inductor when AC current flowing through the coupled inductor windings 412 and thereby produces better high frequency attenuation. Further, the interwinding capacitance of the coupled inductors 402 and 404 enhances the filter characteristic of the filter 150 by contributing to a steeper frequency roll off as shown in FIG. 6.

In particular, each of the coupled inductors 402 and 404 advantageously comprises an interwinding capacitance over about 100 pF in the frequency range of about 10 kHz–100 kHz. According to a presently preferred embodiment, each of the coupled inductors 402 and 404 comprises an interwinding capacitance in the range of about 1,000–2,000 pF in the frequency range of about 10 kHz–100 kHz. Conventional microfilter-design generally dictates use of coupled inductors that have relatively low interwinding capacitances so as to have a relatively linear impedance characteristic and to prevent the coupled inductor from behaving like a capacitor. It has, however, been determined that, contrary to conventional microfilter design, there are significant advantages associated with employing coupled inductors having significant interwinding capacitances in DSL microfilters.

One advantage of employing coupled inductors having interwinding capacitances above about 100 pF is that having a significant interwinding capacitance for each coupled inductor makes the filter 150 behave like a higher-order filter without the cost associated with adding additional filter components. In particular, this design creates a steeper frequency roll off right after the cutoff frequency point than would be possible with a filter having coupled inducted without significant interwinding capacitances. Since this steeper frequency roll off is achieved without raising the component count of the filter the cost of production is not increased. Too high of an interwinding capacitance, however, may adversely affect the high frequency response of the filter 150, such as the response above about 2 MHz. Depending on the application of the filter, the amount of interwinding capacitance may need to be balanced or controlled for possible high frequency response requirements.

Figure 7:
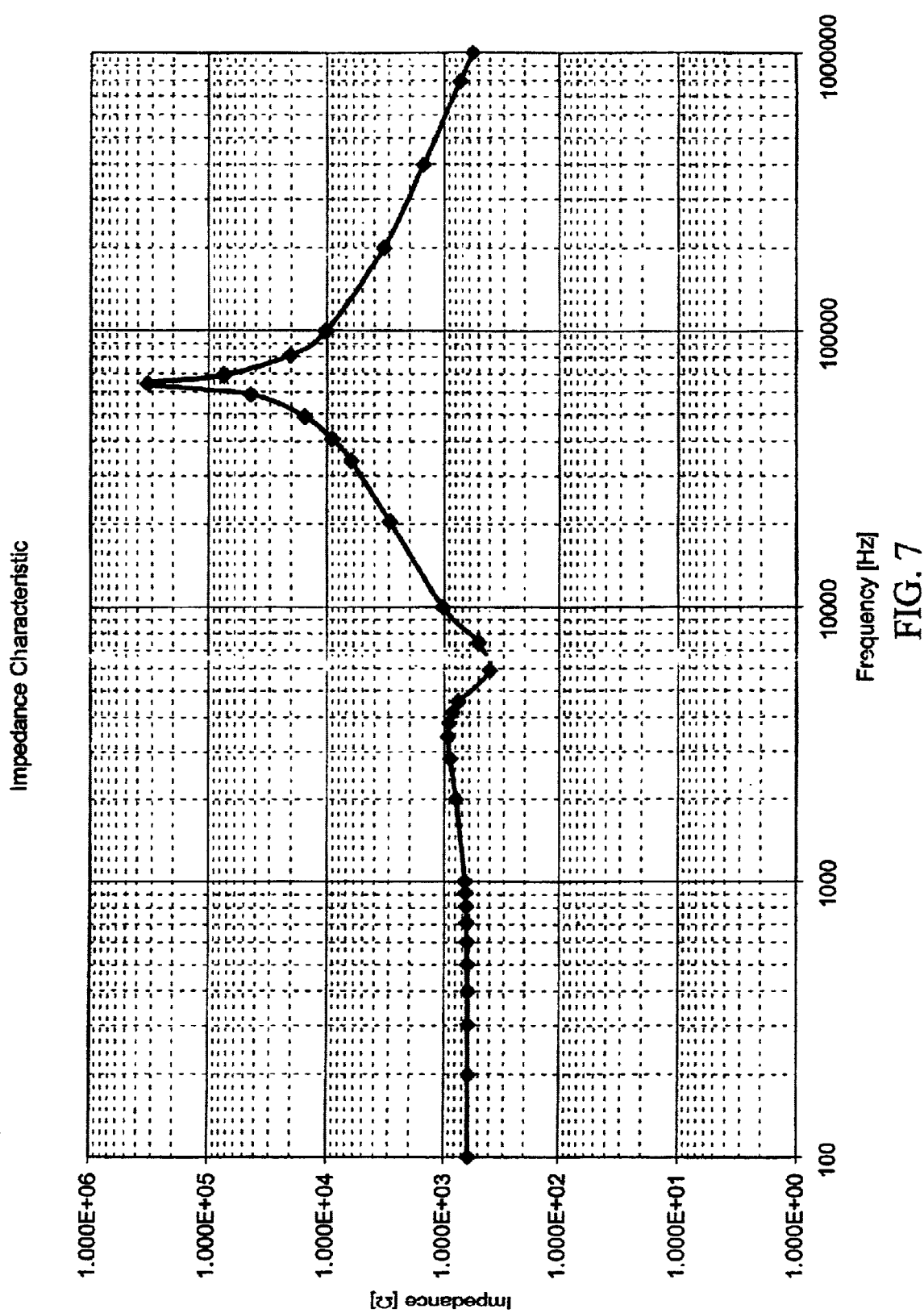
FIG. 7 illustrates the off-hook impedance response of the filter of FIG. 4A.
Figure 8:
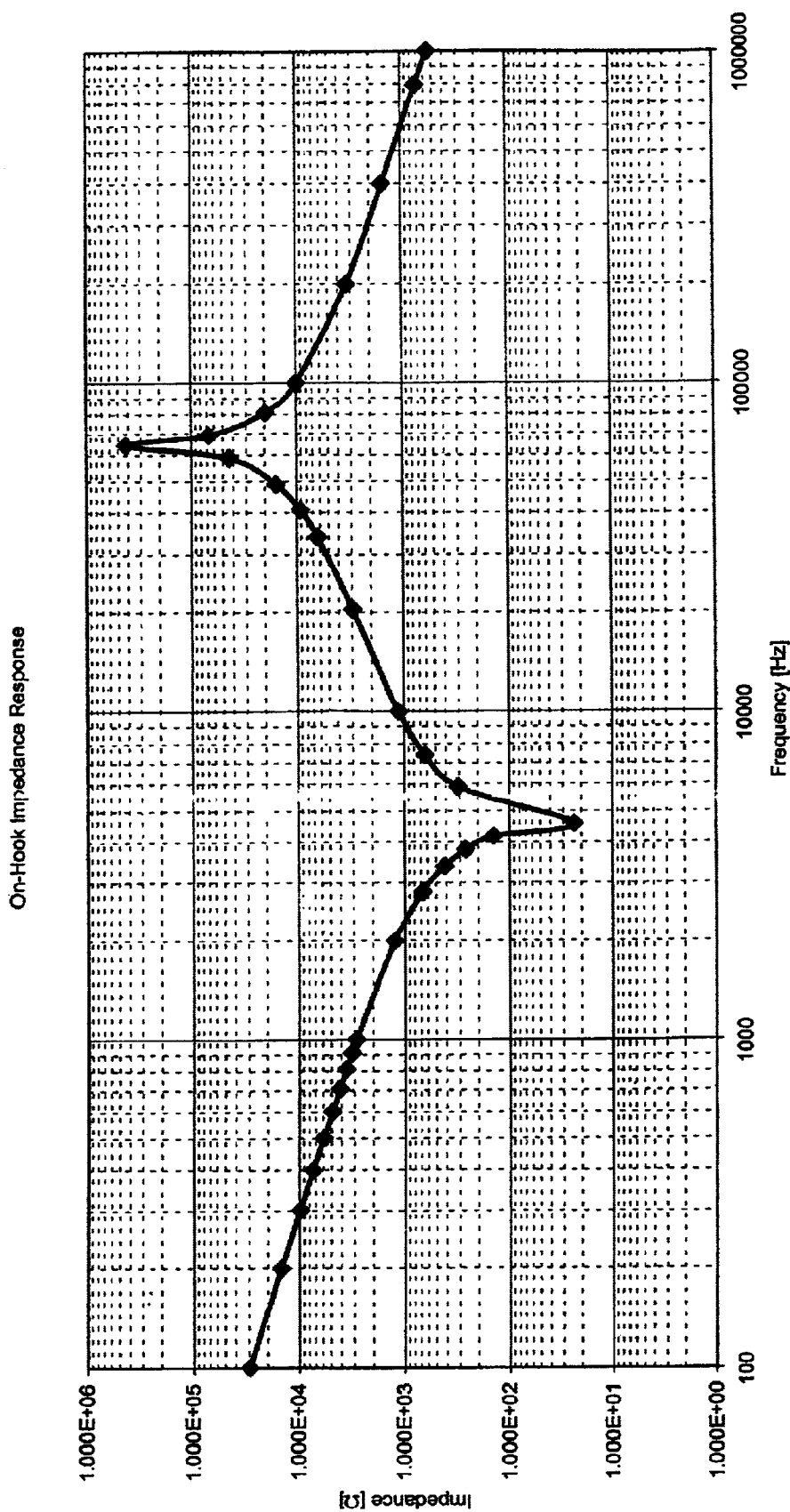
FIG. 8 illustrates the on-hook impedance response of the filter of FIG. 4B.

Another advantage is that although the frequency response of the filter 150 behaves like a higher order filter, the filter 150 maintains its third-order filter impedance characteristics. One important third-order filter impedance characteristic is that the impedance characteristic has only one resonant point. Higher order filters typically have multiple resonant points, or low impedance points, which create additional design complexities in preventing these points from residing in or too close to either the POTS or DSL bands. As shown in FIGS. 7 and 8, although the filter 150 behaves like a higher order filter in its frequency characteristic, the filter 150 maintains a single resonant point that safely resides between the POTS and DSL frequency bands.

Yet another advantage of using coupled inductors having interwinding capacitances above about 100 pF, and preferably between about 1,000 and 2,000 pF, relates to cost. Indeed, as those skilled in the art will appreciate, coupled inductors having little or no interwinding capacitance are typically more expensive than coupled inductors that have an interwinding capacitance greater than about 100 pF. Hence, in addition to the technical advantages of using coupled inductors that have an interwinding capacitance greater than about 100 pF, cost savings in purchasing the coupled inductors may also be effected.

Lastly, as those skilled in the art will appreciate, the ferrite beads 408 reduce high frequency, common mode noise as well as provide EMI suppression. The hazardous transient voltage protection circuit 410 is conventional and is used to protect the associated POTS device from being damaged by transient voltages, such as those that might be produced by a lightning strike, for example. Again, the beads 408 and the voltage protection circuit 410 are optional components and are not critical to the filtering functions of the filter 150. Rather, the beads 408 and the voltage protection circuit 410 may be included for regulatory purposes.

Figure 4B:
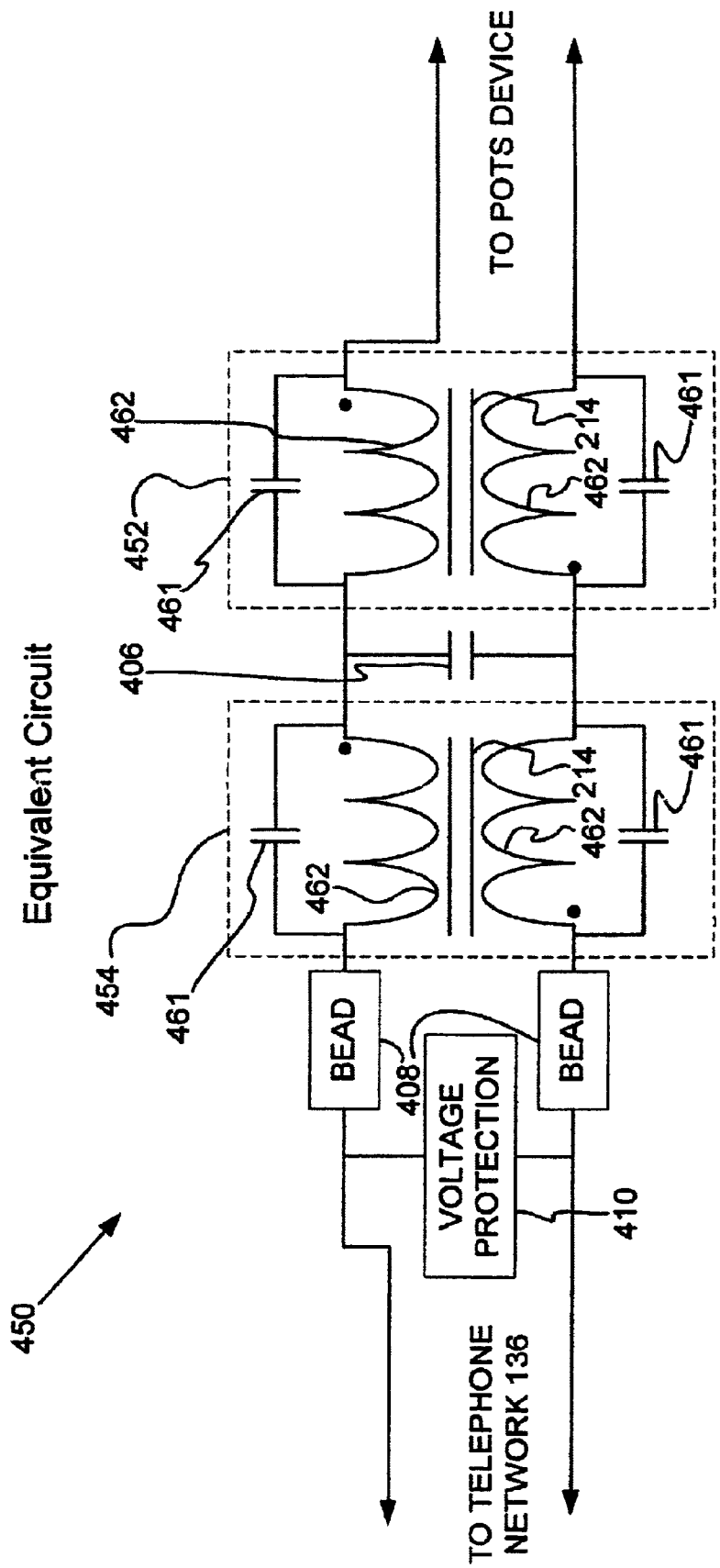
FIG. 4B illustrates details of a circuit electrically equivalent to the filter of FIG. 4A, which uses coupled inductors.

FIG. 4B shows an equivalent circuit 450 that is the electrical equivalent to the filter 150 shown in FIG. 4A and described above to illustrate the interwinding capacitance of the coupled inductors 402 and 404 (FIG. 4A). As shown, the electrical circuit 450 includes coupled inductors 452 and 454. Each coupled inductor 452 and 454 comprises a pair of windings, or inductors, 462 that are wrapped about the inductor core 414 with each winding 462 having an inductance of about 3 mH–7 mH±10% and negligible, or no, interwinding capacitance. A capacitor 461 is positioned in parallel with each of the windings 462 to model the interwinding capacitance of the coupled inductors 452 and 454. Each capacitor 461 has a capacitance of more than about 100 pF, and preferably a capacitance of about 1,000–2,000 pF for the application of suppression of ADSL noise getting into the associated POTS device.

Moreover, as illustrated, the equivalent circuit 450 also includes the capacitor 406, the beads 408, and the voltage protection circuit 410 described above with reference to FIG. 4A. In this configuration, the circuit 450 is electrically equivalent to the filter 150 in that the circuit 450 has an identical, or substantially identical, frequency response and impedance characteristic as the filter 150. Importantly, however, the equivalent circuit 450 has several additional components, namely the four capacitors 461, thereby requiring a substantially higher component count than the filter 150.

Figure 4C:
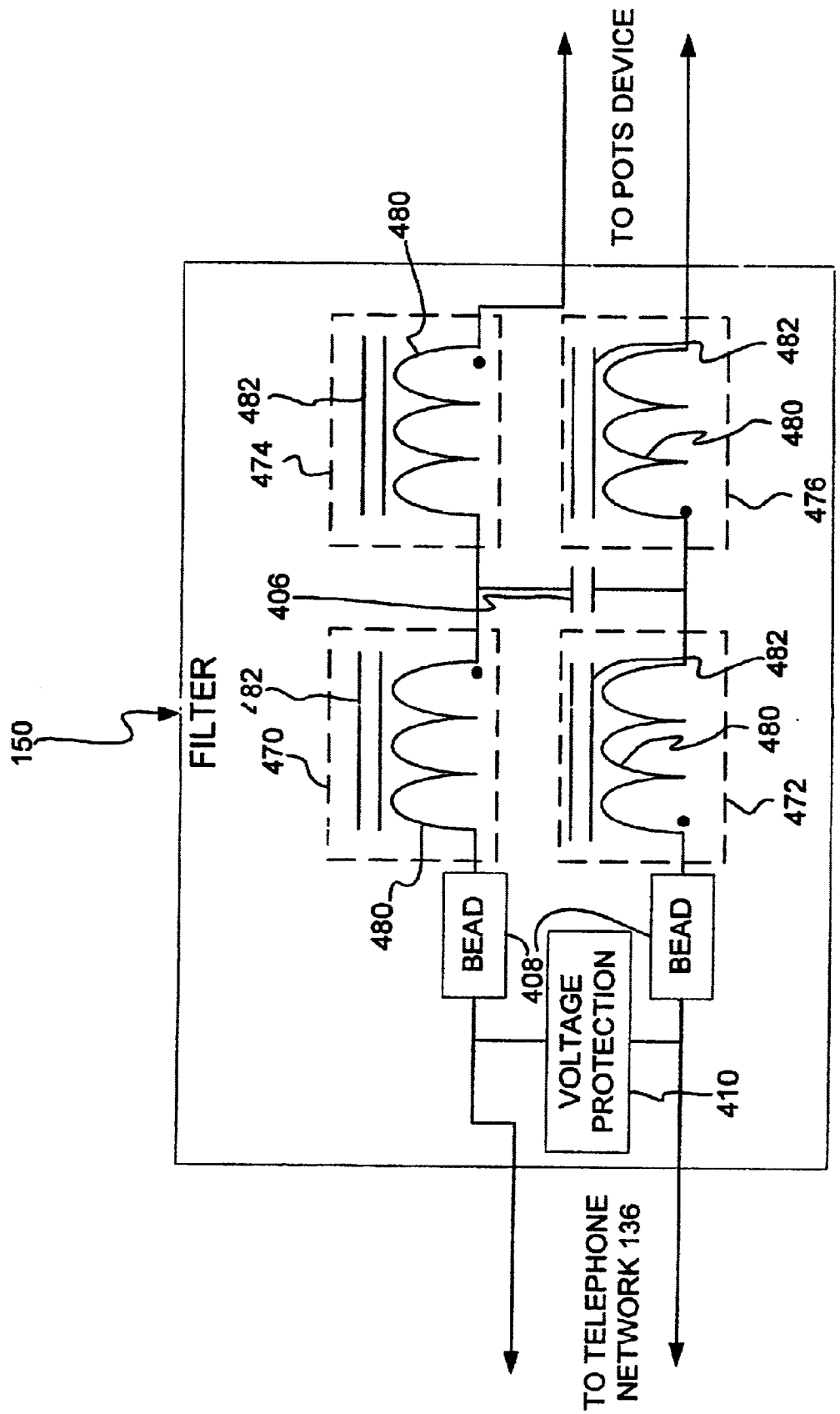
FIG. 4C illustrates details of another embodiment of one of the filters of FIGS. 1 and 3, which uses uncoupled or discrete inductors.

FIG. 4C illustrates another embodiment of the filter 150 wherein the inductor pairs comprise uncoupled inductors 470, 472, 474, and 476. As shown, the uncoupled inductors 470–476 are configured identically to each other and comprise a winding 480 and a ferrite drum-type core 482. Advantageously, each of the inductors 470–476 has an inductance in the range of about 5–15 mH. The capacitor 406 preferably has a capacitance of about 0.047 microfarads, but may have a capacitance in the range of 0.022–0.068 microfarads.

Similar to the embodiment of FIG. 4A, the FIG. 4C embodiment is symmetric and, therefore, reversible. Indeed, the filter 150 of FIG. 4C may be oriented relative to the telephone network 136 as illustrated in FIG. 4C with the inductors 470 and 472 being adjacent to the telephone network 136 or in a reversed orientation (not shown) with the inductors 474 and 476 being adjacent to the telephone network 136. Hence, the filter 150 may be disposed in either orientation between the associated POTS device and the telephone network 136 without shorting high frequency signals, such as ADSL signals, on the network 136 across the capacitor 406. Indeed, in either orientation, a pair of inductors separates the telephone network 136 from the capacitor 406 to prevent high frequency signals, such as ADSL signals, on the network 136 from shorting, or being shunted, across the capacitor 406.

Figure 5:
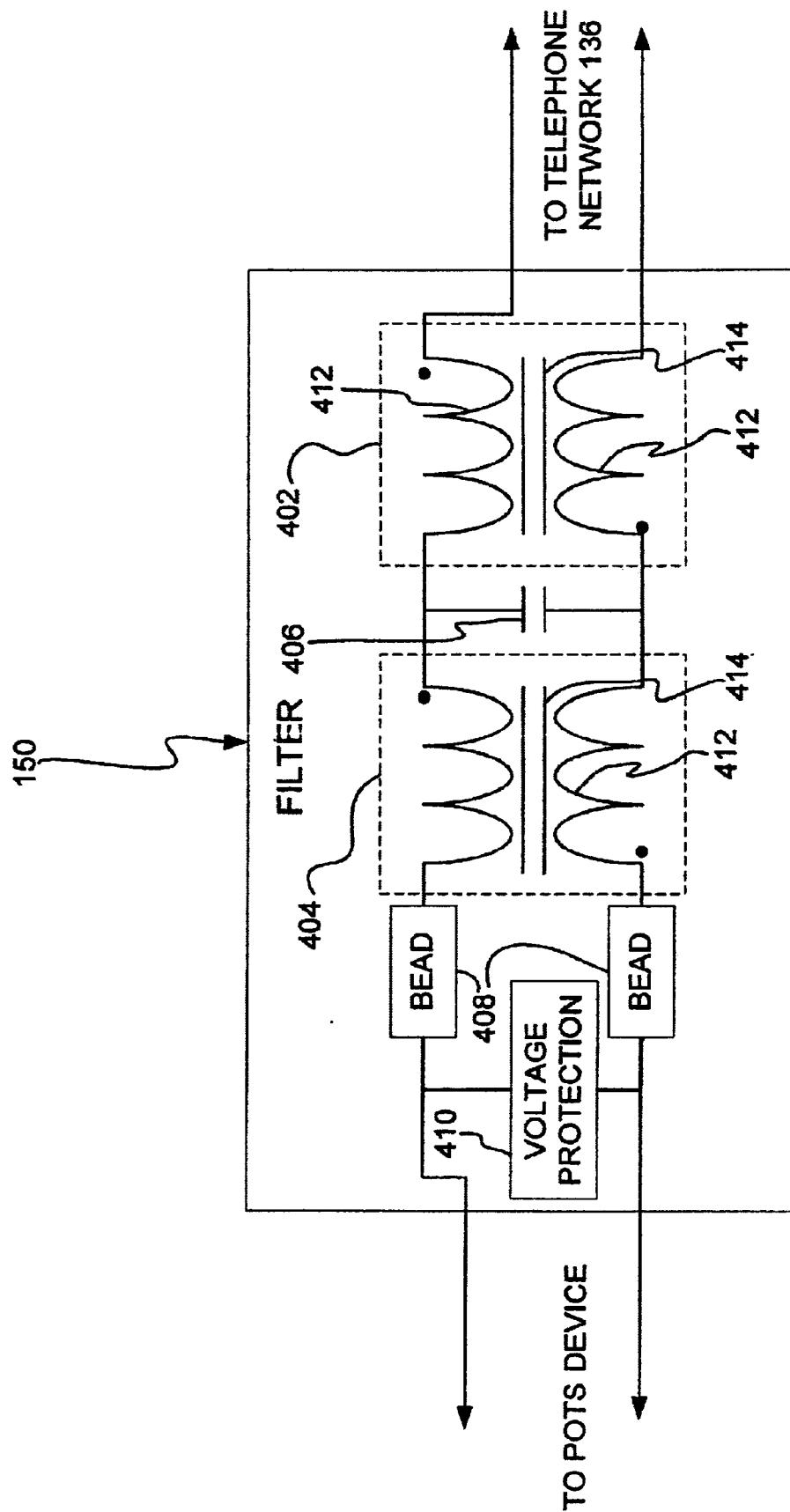
FIG. 5 illustrates the filter of FIG. 4A in a reversed installation configuration.

FIG. 5 illustrates the reversible nature of the filter 150 of FIG. 4A. The filter 150 of FIG. 4C is similarly reversible. That is, FIG. 5 shows the filter 150 of FIG. 4A coupled to the network 136 (FIG. 1) in a manner opposite that shown in FIG. 4A. As illustrated in FIG. 5, the filter 150 is disposed between a POTS device, such as the telephone 138 (FIG. 1) and the home telephone wiring network 136 with the home telephone wiring network 136 being coupled to the filter adjacent to the coupled inductor 402. It should be noted that in the installation of FIG. 5, like in the installation of FIG. 4A, the capacitor 406 is separated from the home telephone wiring network 136 by a coupled inductor. In FIG. 4A, the capacitor 406 is separated from the home telephone wiring network 136 by the coupled inductor, or transformer, 404 whereas in FIG. 5, the capacitor 406 is separated from the home telephone wiring network 136 by the coupled inductor 402.

As discussed above, separating the capacitor 406 from the home telephone wiring network 136 (FIGS. 1 and 3) by a pair of inductors, regardless of the direction in which the filter 150 is installed, prevents the capacitor 136 from shorting, or shunting, high frequency signals, such as DSL or home network signals, that might be present on the home telephone wiring network 136.

FIG. 6 illustrates the frequency response of the filter 150 described above in FIG. 4A. In particular, FIG. 6 depicts the filter frequency response based on an approximately 600 ohm balanced impedance. As shown, the frequency response permits the filter 150 to effectively function as a low-pass filter, permitting passage of signals in the voice band (about 20 Hz–4 kHz), but preventing higher frequency signals, such as those above about 25 kHz from passing therethrough.

Specifically, as shown in FIG. 6, the filter 150 provides negligible, if any, attenuation of voice-band signals below about 4 kH7. For signals above 25 kHz, however, the filter 150 provides over 30 dB of signal attenuation. As an example, for DSL signals in the 100 kHz range, the attenuation is about 56 dB. Another example shows that a 1 MHz signal would be attenuated by about 60 dB. Yet another example shows about 37 dB of attenuation for a 25 kHz signal.

FIGS. 7 and 8 respectively illustrate off-hook and on-hook impedance characteristics of the filter 150 of FIG. 4A in an embodiment where the capacitor 406 has a capacitance of about 0.047 microfarads. As shown, the filter 150 provides a relatively high off-hook impedance (above about 400 ohms) in the DSL band to prevent impedance loading and high signal loss across the DSL band. Hence, the filter 150 will preferably present an impedance greater than about 400 ohms throughout the DSL band for both on-hook and off-hook conditions.

Further, despite the higher-order frequency response behavior of the filter 150, the filter 150 maintains third order impedance characteristics. One impedance characteristic of the filter 150 is that the filter 150 has a single resonant frequency, or resonant point, that resides above the POTS band and below the DSL band. A resonant frequency is generally a frequency at which a filter's inductor and capacitor have approximately equal and opposite reactance, which may lead to a low input impedance dip. In FIG. 8, the resonant frequency is shown as residing in the frequency range 4–6 kHz. When this resonant point resides inside the POTS band, serious impedance impairments and a non-flat frequency response in both on-hook and off-hook states could result. Consequently, it is desirable to not have the resonant frequency reside within either the POTS or the DSL bands.

Filter designs with more series resonant LC pairs may generate multiple resonant frequencies. This could result in having multiple low impedance points in the spectrum and would create even more design complexities in trying to position the multiple low impedance points outside of the POTS and DSL spectrums. Thus, the filter 150 is advantageous in that, due, at least in part, to the intentionally introduced interwinding capacitance of the coupled inductors 402 and 404, the filter 150 impedance characteristic has a single resonant point despite having a filter characteristic that resembles that of a higher order filter.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A reversible odd-order low-pass filter for insertion between a POTS device and a home telephone wiring network to separate certain high frequency signals on the home telephone wiring network from the POTS device, comprising:

a first pair of inductors, each inductor having an inductance in the range of 5–15 mH;

a second pair of inductors, each inductor having an inductance in the range of 5–15 mH;

a capacitor disposed between the first and the second pairs inductors and separated from the home telephone wiring network by either the first or the second pair of inductors to prevent high frequency signals from being shorted across the capacitor regardless of whether the home telephone wiring network is coupled to the filter adjacent to the first or the second pair of inductors, wherein an interwinding capacitance value of the first and the second pair of inductors is selected to create a frequency response of the low pass filter approximately resembling that of a higher order Chebyshev function.

2. The reversible odd-order filter according to claim 1, wherein the capacitor has a capacitance in the range of 0.022–0.068 microfarads.

3. The reversible odd-order filter according to claim 1, wherein each pair of inductors further comprises a coupled inductor having an interwinding capacitance greater than 100 pF in the frequency range of 10 kHz–100 kHz.

4. The reversible odd-order filter according to claim 1, wherein each of the inductors further comprises an uncoupled inductor.

5. A reversible three-pole filter for separating a voice-band device from certain high frequency signals on a home telephone wiring network, comprising:

a first coupled inductor having an interwinding capacitance greater than 100 pF in the frequency range of about 10 kHz–100kHz;

a second coupled inductor having an interwinding capacitance greater than about 100 pF in the frequency range of 10 kHz–100 kHz;

a capacitor disposed between the first and second coupled inductors so that when the filter is interposed between the home telephone wiring network and the voice-band device, either the first coupled inductor or the second coupled inductor separates the signal capacitor from the home telephone wiring network to prevent certain high frequency signals on the home telephone wiring network from shorting across the single capacitor regardless of whether the first coupled inductor or the second coupled inductor is disposed closest to the home telephone wiring network.

6. The reversible filter according to claim 5, wherein the interwinding capacitance of the first coupled inductor is in the range of about 1,000–2,000 pF in the frequency range of 10 kHz–100 kHz.

7. The reversible filter according to claim 5, wherein the capacitor has a capacitance in the range of 0.022–0.068 microfarads.

8. The reversible filter according toe claim 5, wherein each winding has an inductance in the range of 2.7 mH–8.3 mH.

9. The reversible filter according to claim 5, further comprising at least one ferrite bead for reducing common mode noise through the filter.

10. The reversible filter according to claim 5, further comprising a transient voltage suppressor for protecting the POTS device from hazardous transient voltages.

11. A low-pass filter for separating a voice-band device from DSL signals on a home telephone wiring network, comprising:
 a first coupled inductor having a pair of windings wrapped about a core, the first coupled inductor having a interwinding capacitance greater than 100 pF and each winding having an inductance in the range of about 2.7 mH–8.3 mH;
 a second coupled inductor having a pair of windings wrapped about a core, the second coupled inductor having an interwinding capacitance greater than 100 pF and each winding having an inductance in the range of about 2.7 mH–8.3 mH; and
 a capacitor having a capacitance in the range of 0.022–0.068 microfarads disposed between the first and the second coupled inductors to provide over 30 dB of signal attenuation to signals in the DSL band.

12. The filter according to claim 11, wherein the interwinding capacitance of the first coupled inductor is between 1,000–2,000 pF.

13. A reversible odd-order low-pass filter for insertion between a POTS device and a home telephone wiring network to separate DSL signals on the home telephone wiring network from the POTS device, comprising:
 a first pair of uncoupled inductors;
 a second pair of uncoupled inductors;
 a capacitor disposed between the first and the second uncoupled inductors and separated from the home telephone wiring network by either the first or the second pair of inductors to prevent DSL signals on the home telephone wiring network from being shorted across the capacitor regardless of whether the home telephone wiring network is coupled to the filter adjacent to the first or the second pairs of inductors, wherein an interwinding capacitance value of the first and the second uncoupled inductors is selected to create a frequency response of the low pass filter approximately resembling that of a higher order Chebyshev function.

14. The reversible odd-order low-pass filter according to claim 13, wherein the capacitor has a capacitance in the range of 0.022–0.068 microfarads.

15. The reversible odd-order low-pass filter according to claim 14, wherein the capacitor has a capacitance of about 0.047 microfarads.

16. The reversible odd-order low-pass filter according to claim 13, wherein each inductor has an inductance in the range of about 5 mH–15 mH.

17. The reversible odd-order low-pass filter according to claim 13, wherein the filter provides more than about 35 dB of attenuation beginning at 25 kHz to substantially prevent the DSL signals from reaching the associated POTS device and potentially causing performance degradation.

18. The reversible odd-order low-pass filter according to claim 13, further comprising at least one ferrite bead for reducing common mode noise through the filter.

19. The reversible odd-order low-pass filter according to claim 13, further comprising a transient voltage suppressor for protecting the POTS device from hazardous transient voltages.

20. A reversible three-pole filter for separating a voice-band device from certain high frequency signals on a home telephone wiring network, comprising:
 a first pair of inductors;
 a first pair of inductors;
 a capacitor disposed between the first and second pairs of inductors so that when the filter is interposed between the home telephone wiring network and the voice-band device, either the first pair of inductors or the second pair of inductors separates the single capacitor from the home telephone wiring network to prevent certain high frequency signals on the home telephone wiring network from shorting across the single capacitor regardless of whether the first pair of inductors or the second pair of inductors is disposed closest to the home telephone wiring network, wherein an interwinding capacitance value of the first and the second pair of inductors is selected to create a frequency response of the low pass filter approximately resembling that of a higher order Chebyshev function.

21. The reversible three-pole filter of claim 20, wherein each inductor has an inductance in the range of 5 mH–15 mH.

22. The reversible three-pole filter of claim 20, wherein the capacitor has a capacitance in the range of 0.022–0.068 microfarads.

23. The reversible three-pole filter of claim 20, wherein the high-frequency signals further comprise ADSL signals.

24. A reversible odd-order low-pass filter for insertion between a POTS device and a home telephone wiring network to separate certain high frequency signals on the home telephone wiring network from the POTS device, comprising:
 a first pair of inductors, each inductor having an inductance in the range of 5–15 mH;
 a second pair of inductors, each inductor having an inductance in the range of 5–15 mH;
 a capacitor disposed between the first and the second pairs inductors and separated from the home telephone wiring network by either the first or the second pair of inductors to prevent high frequency signals from being shorted across the capacitor regardless of whether the home telephone wiring network is coupled to the filter adjacent to the first or the second pair of inductors, wherein each pair of inductors further comprises a coupled inductor having an interwinding capacitance greater than 100 pF in the frequency range of 10 kHz–100 kHz.

\* \* \* \* \*